(12) United States Patent
Hill et al.

(10) Patent No.: US 6,578,679 B2
(45) Date of Patent: Jun. 17, 2003

(54) BRAKE SYSTEM AND METHOD

(75) Inventors: John L. Hill, Manassas, VA (US);
Donald B. Harris, Arlington, VA (US);
Joram Shenhar, Fairfax, VA (US)

(73) Assignee: UTD Incorporated, Manassas, VA (US)

( * ) Notice: Subject to any disclaimer, the term of this patent is extended or adjusted under 35 U.S.C. 154(b) by 0 days.

(21) Appl. No.: 09/825,364

(22) Filed: Apr. 4, 2001

(65) Prior Publication Data

US 2002/0017439 A1 Feb. 14, 2002

Related U.S. Application Data

(60) Provisional application No. 60/194,370, filed on Apr. 4, 2000.

(51) Int. Cl.[7] ............................................. F16D 65/24
(52) U.S. Cl. ............... 188/170; 188/112 R; 188/196 B; 188/107; 303/8; 303/128
(58) Field of Search ........................ 303/7, 8, 9, 128, 303/53; 188/3 R, 3 H, 33, 39, 107, 106 F, 112 R, 166, 167, 170, 196 B

(56) References Cited

U.S. PATENT DOCUMENTS

| | | | | |
|---|---|---|---|---|
| 2,183,371 A | * | 12/1939 | Stromerg | 303/9 |
| 2,336,342 A | * | 12/1943 | Brewer | 303/7 |
| 2,568,722 A | * | 9/1951 | Dewandre | 303/2 |
| 3,508,794 A | * | 4/1970 | Engle | 188/107 |
| 3,768,871 A | * | 10/1973 | Meyers | 303/9 |
| 3,891,277 A | | 6/1975 | Cope | |
| 4,368,927 A | | 1/1983 | Billingsley et al. | |
| 4,746,171 A | | 5/1988 | Engle | |
| 4,874,065 A | * | 10/1989 | Engle | 188/265 |
| 5,201,890 A | | 4/1993 | Sauer | |
| 5,248,113 A | * | 9/1993 | Daniels | 188/158 |
| 5,469,941 A | | 11/1995 | Horvath | |
| 5,549,363 A | * | 8/1996 | Kanjo et al. | 303/7 |
| 5,564,795 A | | 10/1996 | Engle | |
| 5,586,812 A | * | 12/1996 | Kanjo et al. | 303/7 |
| 5,722,736 A | | 3/1998 | Cook | |
| 5,738,416 A | * | 4/1998 | Kanjo et al. | 303/7 |
| 5,806,937 A | * | 9/1998 | Brunson | 303/7 |
| RE36,036 E | | 1/1999 | Engle | |
| 6,024,414 A | | 2/2000 | Waldrop et al. | |
| 6,039,158 A | * | 3/2000 | Fox et al. | 188/162 |
| 6,152,544 A | * | 11/2000 | Greaves, Jr. | 303/7 |
| 6,175,784 B1 | * | 1/2001 | Jicha et al. | 188/107 |

* cited by examiner

Primary Examiner—Christopher P. Schwartz
Assistant Examiner—Devon Kramer
(74) Attorney, Agent, or Firm—Dickstein Shapiro Morin & Oshinsky

(57) ABSTRACT

The invention relates to a brake system for railway equipment. More particularly, the invention relates to brake devices and systems for pneumatically and manually actuating such devices on railroad train cars such as freight cars. The brake system can be integrated into modern trains without interfering with existing air brake systems. The brake system can be remotely operated, locally pneumatically operated and/or locally manually operated. Monitoring equipment for determining the status of the brakes from remote and local positions may also be provided. The invention may be configured to fit within the envelope of prior art handbrake systems.

17 Claims, 8 Drawing Sheets

BRAKE SYSTEM AND METHOD

This U.S. patent application claims the benefit of the filing date of U.S. provisional patent application Ser. No. 60/194,370, filed Apr. 4, 2000, entitled BRAKE SYSTEM AND METHOD. The entire disclosure of U.S. provisional patent application Ser. No. 60/104,370, filed Apr. 4, 2000, is incorporated herein by reference.

BACKGROUND OF THE INVENTION

Locomotive train cars are required to have handbrake systems. State-of-the-art freight car handbrakes are manpower intensive. Setting and releasing handbrakes exposes operators to safety hazards, and the potential for human error exposes train operations to the potential for time delays, maintenance issues, and ultimately, the potential for rail accidents. Regulations provide that a train may not hold itself on a grade by using the air brakes alone. When the grade becomes too steep for the locomotive handbrakes to hold the train, a crewmember is required to leave the locomotive to set the handbrakes on several of the freight cars. This may be a significant inconvenience to the train crew during times of repeated stoppages on non-horizontal terrain, and it can add to overall operations time.

Problems associated with handbrakes include (1) moving a train with set handbrakes and (2) inadequately setting the brakes when parking a train. Set handbrakes on a moving train can be the result of operator error or negligence. For instance, when a train is to be stopped for an extended period, a trainman must walk to set the handbrakes on a sufficient number of cars to securely park the train. The trainman must walk this distance again and release the brakes when the train is to be moved. A common practice is to set just enough handbrakes to maintain a train's position under given circumstances. With changes in terrain and weather, the actual number of brake settings may vary. A different trainman may release the handbrakes and since it is difficult to visually discern a set handbrake from a released handbrake, some handbrakes may be left in the set position. These factors can result in a train being moved with one or more handbrakes set.

If a train is moved while a handbrake is set, the wheels on an empty car may not turn when the train begins to move, resulting in flattening of the wheels. Wheels damaged in this way must be replaced, which requires the car to be taken out of service and brought to a suitable repair facility, at significant expense and schedule impact. Wheels on a heavily loaded freight car may not skid due to the traction resulting from the greater contact force on the rail. However, an inadvertently set handbrake can damage the running gear due to overheating and rapid brake wear. Studies have shown that "handbrake left on," and flat wheel spots, often caused by moving a train with a set handbrake, are common causes of train failures.

Improper setting of handbrakes is another problem. Proper handbrake application requires a force of 125 lbs. at the handwheel and this force may be missed by weak or inexperienced operators because there is no tangible feedback to the handbrake operator—they must rely on "feel." When handbrakes are set with inadequate force, a car can roll down a slight grade or be blown along the tracks by high winds, causing accidents.

SUMMARY OF THE INVENTION

The handbrake actuator system of the present invention overcomes the problems of the prior art. It can be installed on any of a train's freight cars in the region currently occupied by the handwheel, and it can be connected to the existing brake chain. The system can be designed for automated operation and monitoring of each car from the Head End Unit (HEU), which can be located in the locomotive and operated by the engineer. Manual operation is also enabled by either a pneumatic lever or by a hand crank (requiring significantly less force than 125 lbs. for operation) at carside. If desired, the set condition of the brake can be immediately identifiable when viewing the car from a distance.

According to one aspect of the invention, the actuator consists of a compression coil spring/piston arranged to apply tension to the handbrake chain. The default condition is the "set" position. Two redundant systems may be provided to release the brake. The first is an air actuator connected in series with the spring and chain. Applying air pressure (remotely or by local levers) compresses the spring and releases the handbrake. Secondly, a manual handwheel type actuated mechanism will also compress the spring and release the brake.

In the Electronically Controlled Pneumatics (ECP) system in modern trains, each rail car currently has access to a 230 volt DC (VDC) line of which 10 watts of power are available to each car. The present invention can take advantage of this power availability for reliable function, operation and monitoring. Moreover, the present invention can be arranged to interface with the existing Car Control Device (CCD) (a component of the ECP system) currently used in the art. Thus, the present invention may be readily integrated into state-of-the-art freight cars.

In modern trains, a single brake pipe containing 90 psi air pressure (as measured near the compressor, 75 psi at the train's far end) with a minimum delivery capability of 60 cubic fee per minute (cfm) is used to charge the primary brake system of each car. The present invention can be arranged to utilize this pre-existing supply of air, if desired. Additionally, existing air brake systems have an air reservoir on each freight car. The handbrake system of the invention can be arranged so as not to interfere with the existing air brake systems.

The present invention can be used to provide a reliable, constant force to the friction mechanism at the wheels. Freight cars typically have a chain that connects the existing force-producing mechanism to the friction mechanism. The present invention may be integrated to use this brake chain. Currently, brake systems are tested to ensure the tension on the brake chain is between 3350 and 6200 lbs. when a force of 125 lbs. is applied to a handwheel (for conventional vertical wheel handbrakes). It would be highly desirable to reduce this handwheel force requirement for setting the brakes. In addition, operation from the side of the car without the requirement to mount the car to operate the brake is highly desirable. The location of the handwheel in the prior art requires operators to place themselves between cars to operate it, and often involves climbing onto the car itself.

An object of the present invention is to provide a brake system that is rugged enough to work reliably in the typical freight car environment, taking into account shock, intense vibration, severe temperature changes, moisture, etc. If desired, the present invention can be uncomplicated and compact enough to fit within a similar space envelope to that of prior art handwheel type handbrake system. It would be advantageous for a new system to bolt directly as is, or with some modification, into the space currently occupied by the handwheel-type handbrake so that the system can accommodate the hand mechanisms at the sides of the car.

The above and other characteristics and advantages of the handbrake system of the invention can be better understood from an analysis of the following written description and the accompanying drawings, where like reference numbers represent like elements.

DETAILED DESCRIPTION OF PREFERRED EMBODIMENTS

Figure 1:
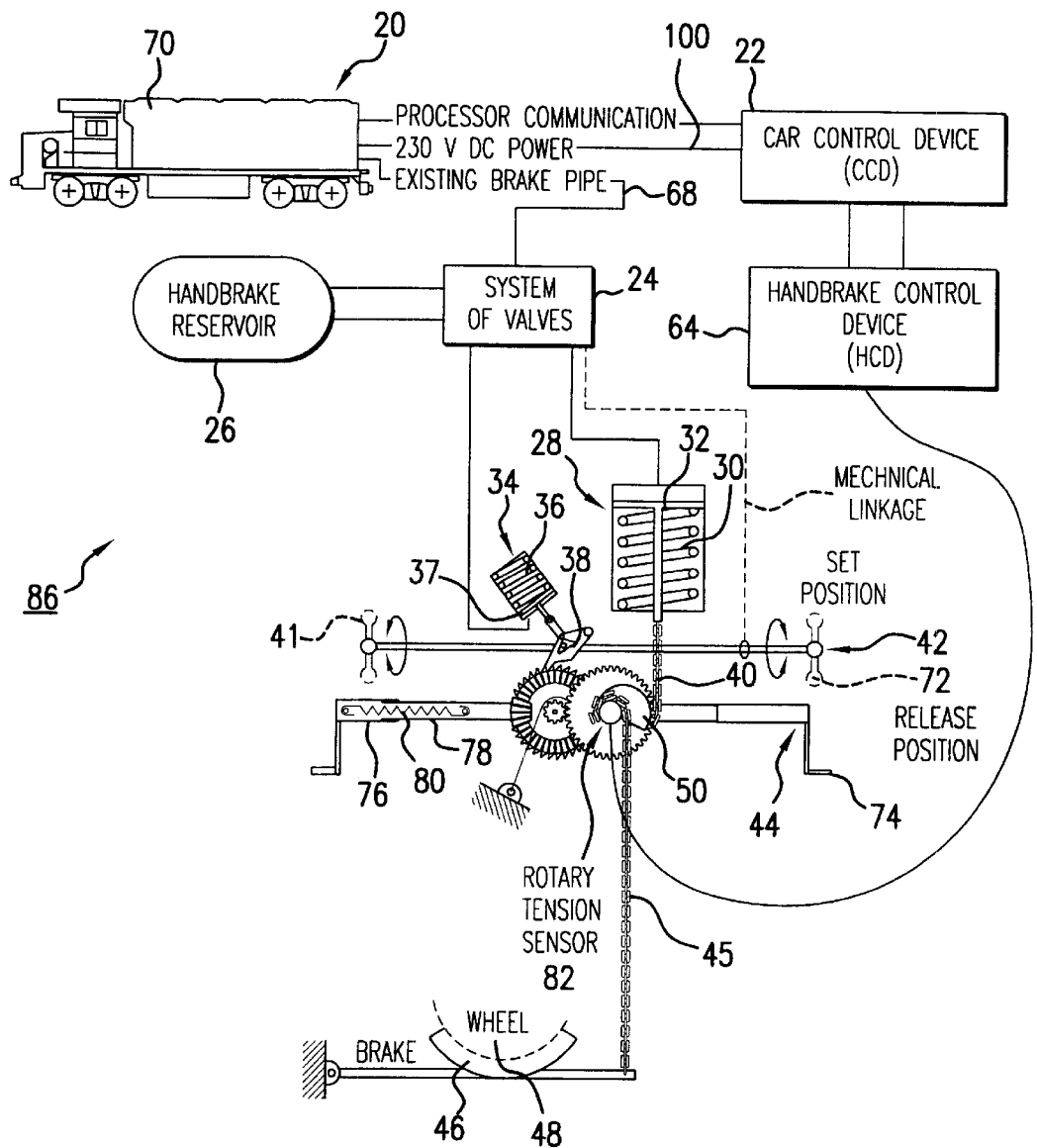
FIG. 1 is a schematic depiction of a handbrake system constructed in accordance with the present invention.

Referring now to the drawings, where like reference numerals designate like elements, there is shown in FIG. 1 a handbrake system 86 for a freight car 84. As shown in FIG. 1, the handbrake system 86 is connected to a Head End Unit (HEU) 20 and a Car Control Device (CCD) 22. A handbrake control device (HCD) 64 responds to signals sent through the CCD 22 (to be explained in more detail below). The HCD 64 controls a system of valves 24 to charge and release air from a handbrake air reservoir 26 (not associated with the primary brake system). The air pressure from the reservoir 26 in turn controls two pistons 32, 37 that control the tension on a brake chain 45.

Figure 3:
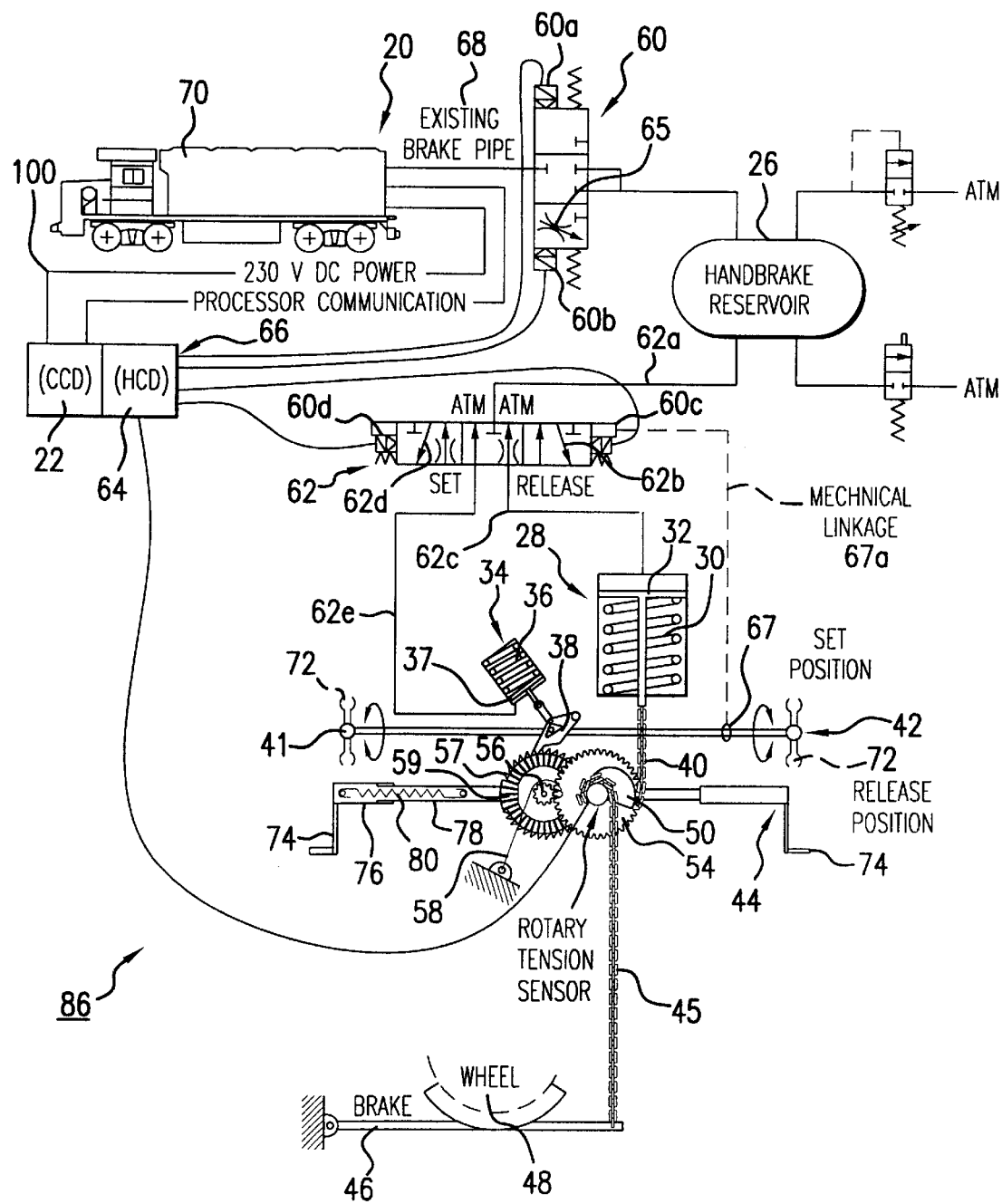
FIG. 3 is another schematic depiction of the handbrake system of FIG. 1.

The default condition is the "set" position shown in FIG. 1. In the set position, the main coil spring 30 applies tension to the chain 45. The chain 45 pulls a brake 46 to apply friction to a wheel 48. Two redundant systems are available to release the brake 46. In the first release system, the handbrake air reservoir 26 is opened to apply air pressure to the main spring/piston cylinder 28. The air pressure compresses the spring 30 to release tension on the chain 45 and release the brake 46. The first release system is controlled by a lever 41, 42 at either side of the freight car. The lever 41, 42 is connected via a mechanical linkage 67a to a multi-position valve 62 (FIG. 3). In the release position, air from the reservoir 26 communicates through lines 62a, 62b, 62c to compress the spring 30 to release the tension on the chain 45. The HCD 64 may be used to move the valve 62 to the set position, where pressure from the reservoir 26 is applied through lines 62a, 62d, 62e to the second piston 34.

The second release system involves a manual handcrank 44 (or handwheel if desired). The handcrank 44 can be used to apply tension to a chain 40, to move the piston 32 downwardly as shown in FIG. 3, thereby compressing the spring 30 and releasing the brake 46. As depicted in FIG. 1, a two position pawl 38 will latch the handbrake actuator system 86 in the released position (FIG. 2), but is arranged to disengage if the brake 46 is applied pneumatically either through remote or local command or mechanically via the same lever used for pneumatic activation. As shown in FIG. 1, the handbrake system 86 is designed to be remotely or locally actuated. Local operation is designed to be at the side of the freight car and reachable by an operator standing on the ground.

Figure 2:
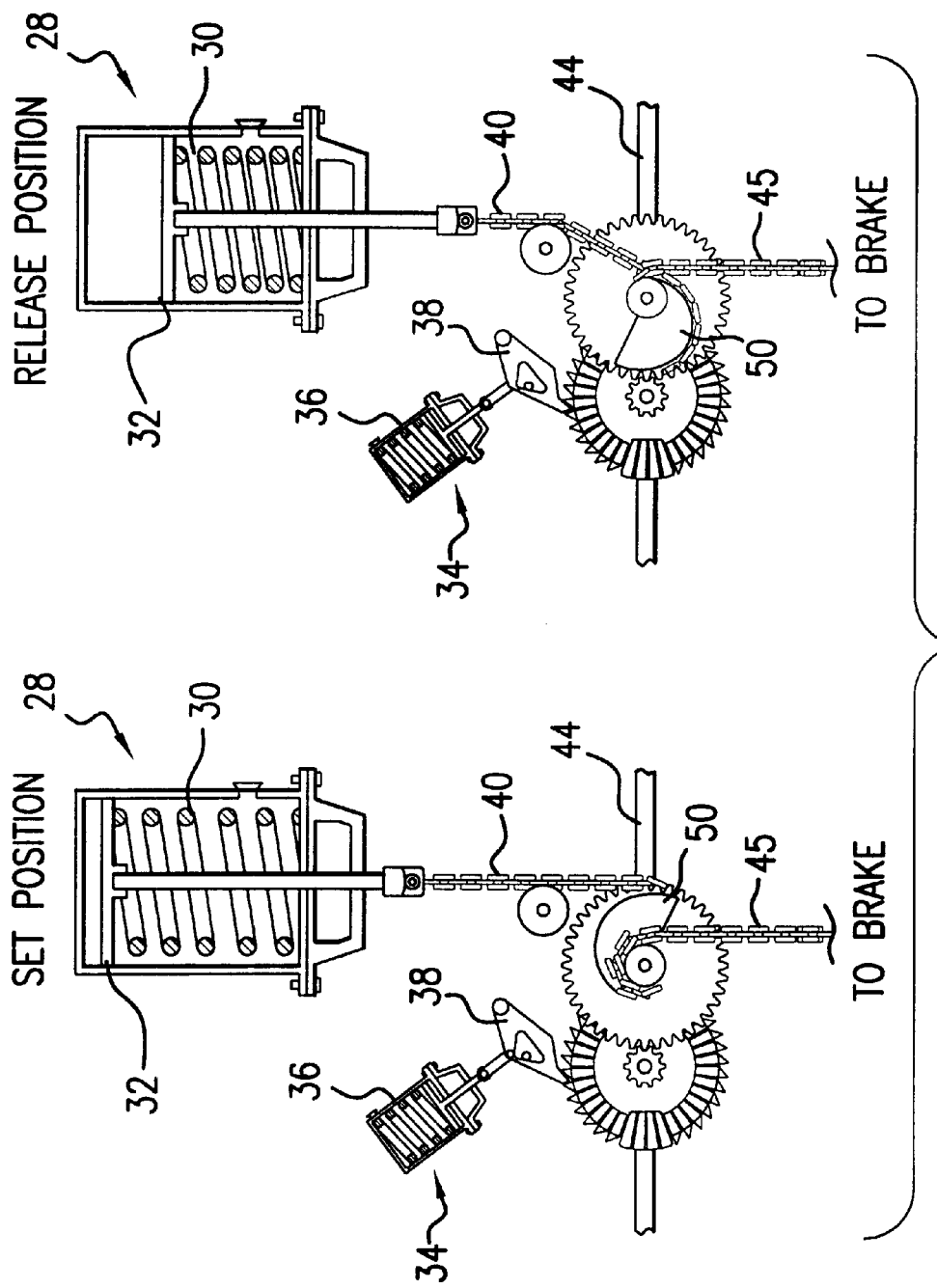
FIG. 2 illustrates set and release operational positions for the handbrake system of FIG. 1.

Referring to FIG. 2, illustrated is a comparison of the "set" and "released" conditions of the handbrake system 86. The default "set" condition is driven by the internal spring 30 of the main cylinder 28. As a result, setting of the handbrake 46 requires no air input to the main cylinder 28 and very little mechanical input by an operator during local operation. In the "set" position, the spring 30 of the main cylinder 28 is fully extended to its preloaded condition. An opening to the atmosphere in the cylinder 28 allows the spring 30 to push the piston 32 almost to the top of the cylinder, pulling the attached chain 40, turning the cam 50 (or alternative device), which pulls the brake chain 45 to set the brake 46. In the release position (FIG. 2), the spring 30 is compressed by the piston 32 as a result of increased air pressure in the cylinder 28. This compression forms slack in the chains 40, 45 such that the brake 46 moves away from the wheel 48.

As shown in FIG. 3, air pressure for pneumatic control can be maintained by a multi-position supply valve 60 on one side of the reservoir 26 and a distribution valve 62 on the other. Three methods of handbrake operation are shown in this diagram: remote pneumatic, local pneumatic and local manual. The latter requires the utilization of hand mechanisms that allow for the control of the brake 46 independent of power or control from the locomotive 70.

Because the electric power for each freight car 84 may be limited to 10 Watts and a single solenoid consumes about 7 Watts, it becomes important to note that of the four solenoids 60a, 60b, 60c, 60d (found two-each in the supply valve 60 and distribution valve 62), no two should be operated simultaneously. Thus, in a preferred embodiment of the invention, the solenoid energization sequence may be as follows: 1) solenoid 60b opens the supply valve 60 fully to charge the air brake reservoir 26; 2) then solenoid 60d places the distribution valve 62 in a "release mode" position to release the brake 46; 3) then solenoid 60a causes the supply valve 60 to open a restricted passageway 65 to trickle charge the handbrake reservoir 26 while underway; and 4) solenoid 60c moves the valve 62 to the set position to set the handbrake 46 by applying pressure through line 62e.

As shown in FIG. 3, there may be four wires 66 from the microprocessor (in the HDC 64) that control the two pneumatic valves 60, 62. The wires 66 are connected to the respective solenoids 60a–60d. The first valve 60 controls the supply of air to the reservoir 26. The second valve 62 distributes the air from the reservoir 26 to the two spring-loaded actuators 28, 34. Note that in the non-energized position of both valves 60, 62, as drawn, air is blocked from escaping from the reservoir 26, and the distribution valve 62 has both cylinders 28, 34 vented to the atmosphere to facilitate hand operation.

The brake pipe 68 connects a compressor (not shown) at the locomotive 70 to the freight cars 84. The supply valve 60 blocks passage from the handbrake system 86 to this pipe 68 so that after the air brake reservoirs 26 have been charged, just prior to the train's departure, the brake pipe 68 and air brake system can be leak tested without any air flow into the handbrake system 86. The two energized positions of the supply valve 60 are "rapid recharge" and "slow recharge." Thus, when a freight car 84 is added to the train, its reservoir 26 can be filled rapidly so that the car has the pneumatic energy to release the handbrake 46. The slow recharge position (utilizes the restricted passage 65 of the valve 60) is used when the train is under way, after a brake release has been completed. At this time the reservoir 26 is about half depleted. Other air reservoir sizes may allow for more or fewer actuations. Slow recharge is facilitated by a small orifice 65 which is sized so that the air that bleeds into the handbrake reservoir 26 will not cause a pressure drop in the air line 68 sufficient to initiate an automatic application of the air brake system.

Thus, remote pneumatic operation of the handbrake 46 can be achieved by the distribution valve 62. The valve 62 has two energized positions: "release mode" and "set mode." In the release mode, air flows into the main cylinder 28 and moves the piston down 32 while its chain 40 is collected by a cam shaped pulley 50 (or an alternative device) and the brake chain 45 is metered out, thus releasing the brake 46. As shown in FIG. 3, the chain 40 movement allows for the rotation of a large gear 54 that drives a smaller gear 56, attached to a large bevel gear 57. This bevel gear 57 drives two smaller bevel gears 59, all of which are forced to move by a gearbox spring 58. The retracted crank handles 74 are rotationally disengaged from the smaller bevel gears 59 so that this entire gear assembly 54, 56, 57, 59 is free to spin or "free wheel." When the main piston 32 stops its travel its position is maintained by a latching pawl 38, so that the brake 46 is held in the released position. When the distribution valve 62 is in the set mode position, air is fed into the pawl cylinder 34, causing the pawl 38 to disengage from the gear 57. The main spring 30 is now free to push the piston 32 upwardly to apply tension to the chain 40, such that the gears 54, 56, 57, 59 free wheel as the brake chain 45 is tensioned and the brake 46 is applied.

Local pneumatic operation (i.e., by an operator standing near the brake chain 45) is achieved by the handle 72. The handle 72 controls the brake 46 via the linkage 67a and the distribution switch 62, provided there is sufficient air pressure in the reservoir 26. The reservoir 26 is sized to store enough compressed air for two set/release cycles. The handle 72 can be operated from both sides of the freight car so that a person standing on the ground on either side of the car can operate it. The three-position control (the distribution valve 62 has a set position, an inactive position, and a release position) can be extended to a third location on the car's top, if desired, for brake control while the car is involved in a rail yard "humping" operation. Moving the handle 72 to the "release position" rotates a lever (not shown) against a push button mechanism 67 on the distribution valve 62 causing the valve 62 to shift into the "release (valve) mode." After this action, the mechanics are the same as in the remote pneumatic operation, as previously described. The brake 46 can be set by operating the three position handle 72 to the "set position," which mechanically forces the pawl 38 to disengage, freeing the main spring 30 which pushes the piston 32 up while it pulls on it's chain 40 causing the gears to free wheel as the brake chain 45 is tensioned.

Local manual operation can be used when the reservoir 26 is depleted. The brake 46 can be manually released by operating a retractable crank handle 74 (part of the manual handcrank 44) located on each side of the freight car 84. The energy is delivered through the bevel gears 57, 59, spur gears 54, 56, and chain 40. The cam 50 is a mechanism of varying mechanical advantage that can be utilized so that the force required at the crank handle 74 remains constant. Mechanical devices other than the cam 50 can be used as well, as is known in the art. As the spring 30 compresses, the increased tension of the chain 40 is offset by the increasing mechanical advantage of the cam 50. Pulling out the crank handle 74 causes the shaft's outer sleeve 76 to rotationally engage with the inner sleeve 78 50 that a force of about 30 pounds on the handle 74 will be delivered through the shaft and gear train to apply about 5000 pounds of force on the spring 30. The pawl 38 holds the brake 46 in the released position. The railroad worker may then ensure that the crank handle 74 is properly retracted. An internal spring 80 holds the handle 74 in the retracted position. The brake 46 can be set by operating the three position handle 72 to the "set position," the mechanics being the same as in the local pneumatic operation, as previously described.

The condition/system response of a preferred embodiment is discussed below. In the default brake condition, the brake 46 remains in its last commanded position, whether the command was made by remote pneumatic, local pneumatic, or local manual means, and the control elements of the system 86 always return to the same non-energized position. Thus, before and after train departure, the following conditions initiate related responses. Charging of the air brake reservoirs 26 before the train's departure results in the Car Control Device (CCD) 22 assessing the state of the handbrake reservoir 26 during primary brake charging and the signaling of the handbrake reservoir 26 supply valve 60 to open, allowing recharge. This air demand can be small because most freight cars 84 have, prior to being recharged, only used air pressure for a "brake set," which uses very little air. Testing for air leakage prior to departure after the charging of all handbrake and airbrake reservoirs results in the HEU 20 computer in the locomotive 70 signaling the supply valve 60 to open (i.e., the solenoid 60b is activated by one of the lines 66 to move the valve 60 to the fast charge position) so that the fully charged brake system 86 is tested. The train then releases its brakes and gets underway, and then the HEU 20 computer in the locomotive 70 signals the supply valve 60 to open a restricted orifice 65 (via solenoid 60a) to trickle recharge the reservoirs 26 as needed. The handbrake 46 release will have depleted about half of the pressure in the reservoir 26. Note that setting the handbrake uses essentially no air pressure.

Normal handbrake operational mode includes the following conditions initiating the related responses. When all handbrakes are released and the operator wants to set them, the operator enters a command at the HEU 20 computer signaling for a brake set operation. The CCD 22 receives the signal, triggers the release of the set spring 30, monitors the brake 46 response via the tension of the chain 45 and indicates to the HEU 20 computer, and operator, the new condition of the brake 46. When all the brakes 46 are set and the operator wants to release them, the operator enters a command at the HEU 20 computer, which signals the CCD 22 for a brake release operation. The CCD 22 opens the air valve (lines 62a, 62b, 62c) to the main spring/piston cylinder 28, compressing the set spring 30, and thereby releasing the brake 46. The CCD 22 monitors the brake 46 response via the tension of chain 45 and indicates to the HEU 20 computer, and operator, the new condition of the brake 46.

When the car is separated from the train, the following conditions initiate related responses. When the handbrake reservoir 26 is charged, the brake 46 is set, and operator wants to release the brake 46, the operator rotates one of the pneumatic levers 42 to "release position" and holds that position until a visual indicator shows that the brake 46 is released. If the handbrake reservoir 26 is depleted, handbrake 46 is set, and the operator wants to release it, the operator pulls out one of the retractable crank handles 74 and rotates it until the visual indicator shows that the brake 46 is released. If the handbrake 46 is released and the operator wants to set it, the handbrake reservoir 26 is not utilized. In that case, the operator rotates one of the levers 74 to "set position" and holds that position until the visual indicator shows that the brake 46 is set. The internal spring 80 in the manual lever 74 determines the desired setting force.

Figure 3A:
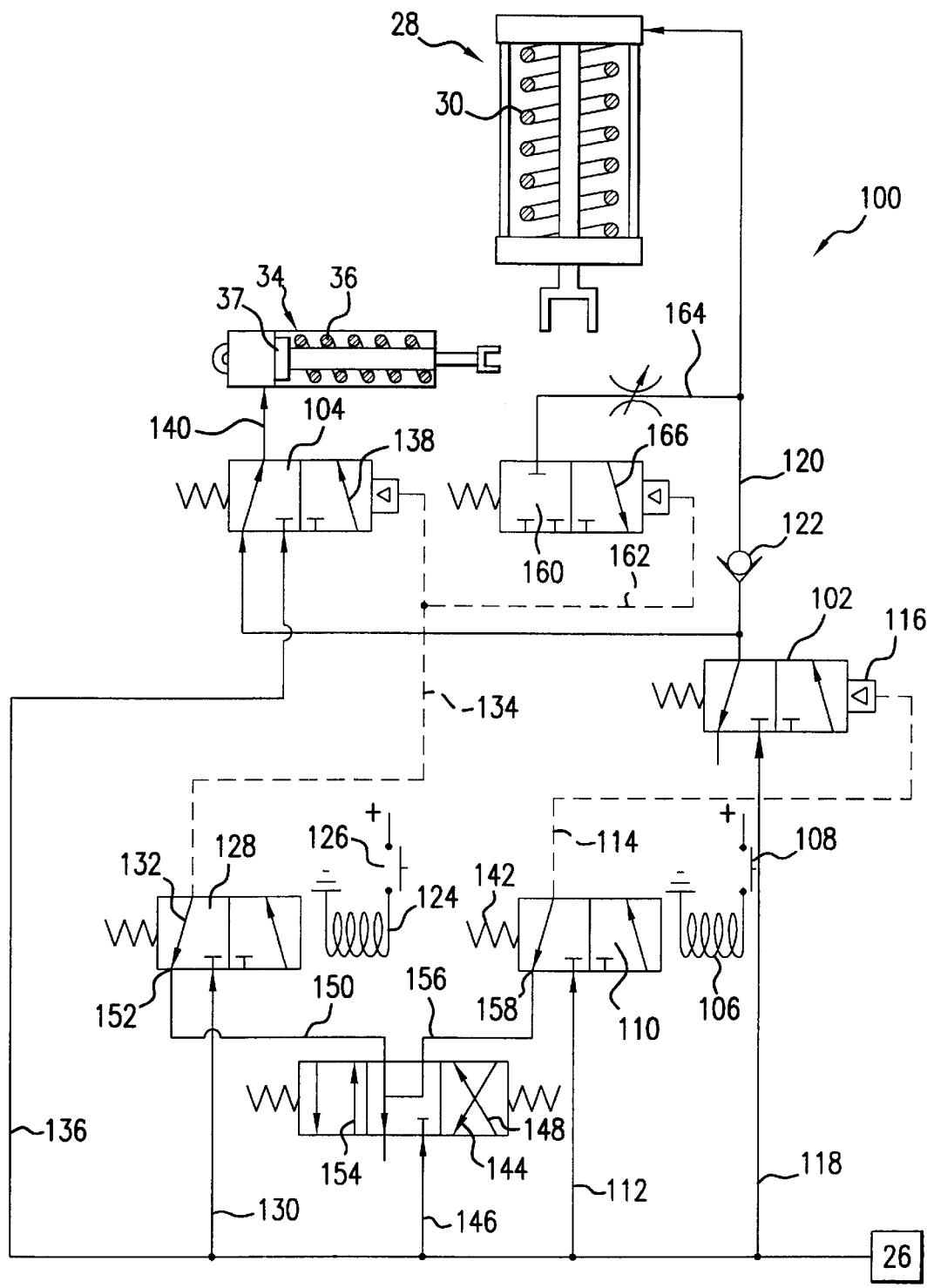
FIG. 3A is a schematic illustration of another handbrake system constructed in accordance with the present invention.

Referring now to FIG. 3A, there is shown an alternative pneumatic valve system 100 for operating the brake 46. The pneumatic system 100 is connected to the pressure reservoir 26. The system 100 has a brake release valve 102 and a brake set valve 104. When a first solenoid 106 is actuated by a switch 108, a first signal valve 110 is moved to the right, such that pressure is applied through lines 112, 114, 116 to move the brake release valve 102 to the right to a release position. When the brake release valve 102 is in the release position (moved to the left), pressure is applied from the reservoir 26 through lines 118, 120 to compress spring 30 to release the brake 46 as discussed above in connection with FIGS. 1–3. A check valve 122 is provided for preventing air from flowing in the opposite direction through line 120.

When a second solenoid 124 is operated by a switch 126, a second signal valve 128 is moved to the left (the position shown in FIG. 3A) such that air pressure is applied through lines 130, 132, 134 to move the brake set valve 104 to the left (i.e., the brake set position). When the brake set valve 104 is in the brake set position, air pressure is applied through lines 136, 138, 140 to compress spring 36 to set the pawl 38 as discussed above in connection with FIGS. 1–3.

When the first switch 108 is opened, the first solenoid 106 is deactivated, such that the first signal valve 110 is moved by a spring 142 to the right, such that the brake release valve 102 can be operated manually by a manually actuated valve 144. Likewise, when the second switch 126 is closed, the second signal valve 128 is moved to the left, such that the brake set valve 104 is operated by pressure from line 130. Thus, when the manual valve 144 is moved to the left, pressure from the reservoir 26 is applied to a second port 152 of the second signal valve 128 through lines 146, 148, 150. When the manual valve 144 is moved to the right (as shown in FIG. 3A), pressure is applied through lines 146, 154, 156 to a second input port 158 of the first signal valve 110.

If desired, the electrical switches 108, 126 may be operated by the computer system described above in connection with FIGS. 1–3. The manual valve 144 may be operated pneumatically and/or manually in the manner discussed above in connection with FIGS. 1–3. Whenever the brake set valve 104 is moved to the right, a pressure relief valve 160 is actuated by line 162 to bleed air from the brake release cylinder 28 though lines 164, 166.

Further, the present invention can take into consideration the need to have reliable feedback to the remote operator regarding the status of the brake 46. Monitoring the rotation of the gear 54 (FIG. 3) provides an economical and reliable means of meeting this need. A rotary spring tension sensor 82 (FIG. 1) can be provided for this purpose. The sensor 82 provides continuous monitoring of the position of the gear 54 at very low power levels to the HCD 20. An additional advantage of using this sensor 82 is that the position for mounting the sensor 82 is stationary and environmentally protected by the cam 50 and gears 54, 56, 57, 59 and, if desired, by a protective covering that may be used to cover the entire system 86.

Figure 4:
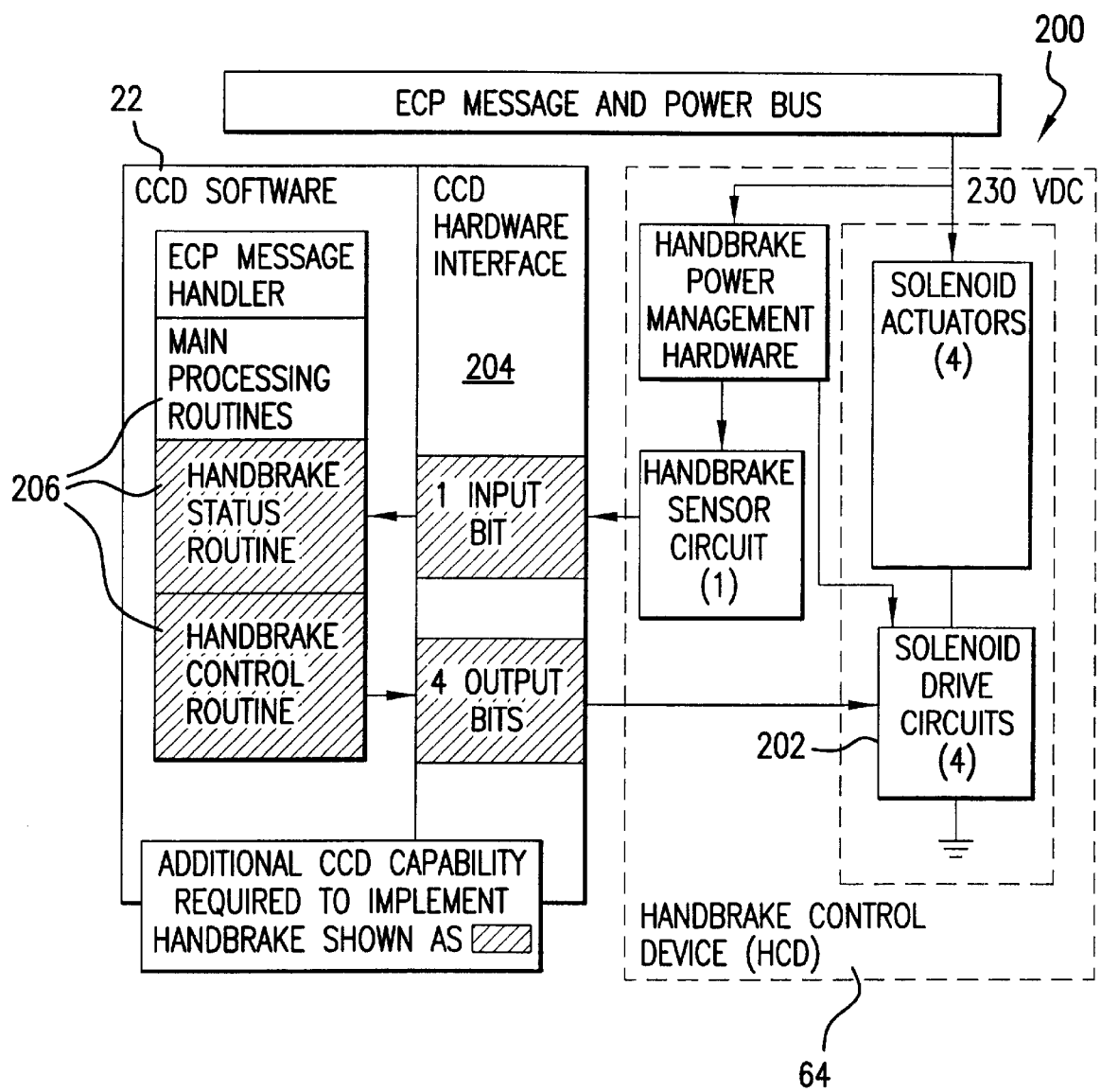
FIG. 4 is a diagram of the control system for the handbrake system of FIG. 1.

If desired, the handbrake actuator system 86 involves certain integration of the system 86 into the existing ECP and utilization of existing power resources. FIG. 4 shows the resulting integration concept. Descriptions of each component of the integration follow. FIG. 4 illustrates the on board hardware and software requirements to implement handbrake system 86. Solenoid Power may be taken directly from the available 230 VDC source 100. The drive circuit 202 will utilize ground referenced solid state switching devices. Logic level voltage may be derived from either the additional power management hardware provided in the handbrake hardware design or it may be taken from the CCD 22 logic supply and would be used only for switch and transducer bias. The transducers are ground referenced solid state switching devices, which will indicate binary events such as "handbrake on" or "handbrake off." In the illustrated embodiment, power can be compatible with the logic levels of the CCD 22. The present invention should not be limited, however, to the preferred embodiments shown and described in detail herein.

In the illustrated embodiment, the input transducers will exhibit both mechanical and electrical hysteresis to insure decisive event thresholds. The transducer drive circuits will perform any shift in drive voltages from the logic levels of the CCD 22 to the power levels of the solenoids or sensors. All drive and input circuits will be ground referenced and use devices which will handle the differences in supply voltage of the solenoids and the CCD device 22. If desired, drive routines 206 can be added to the CCD 22 to properly manage the transducers and provide software information to the main program of the CCD 22, which can be packaged into messages to or from the HEU 20. These messages are the means of transferring both brake status and brake control information between the CCD 22 and hardware interface 104. The handbrake status and control information can be integrated into the normal ECP messages.

Figure 5:
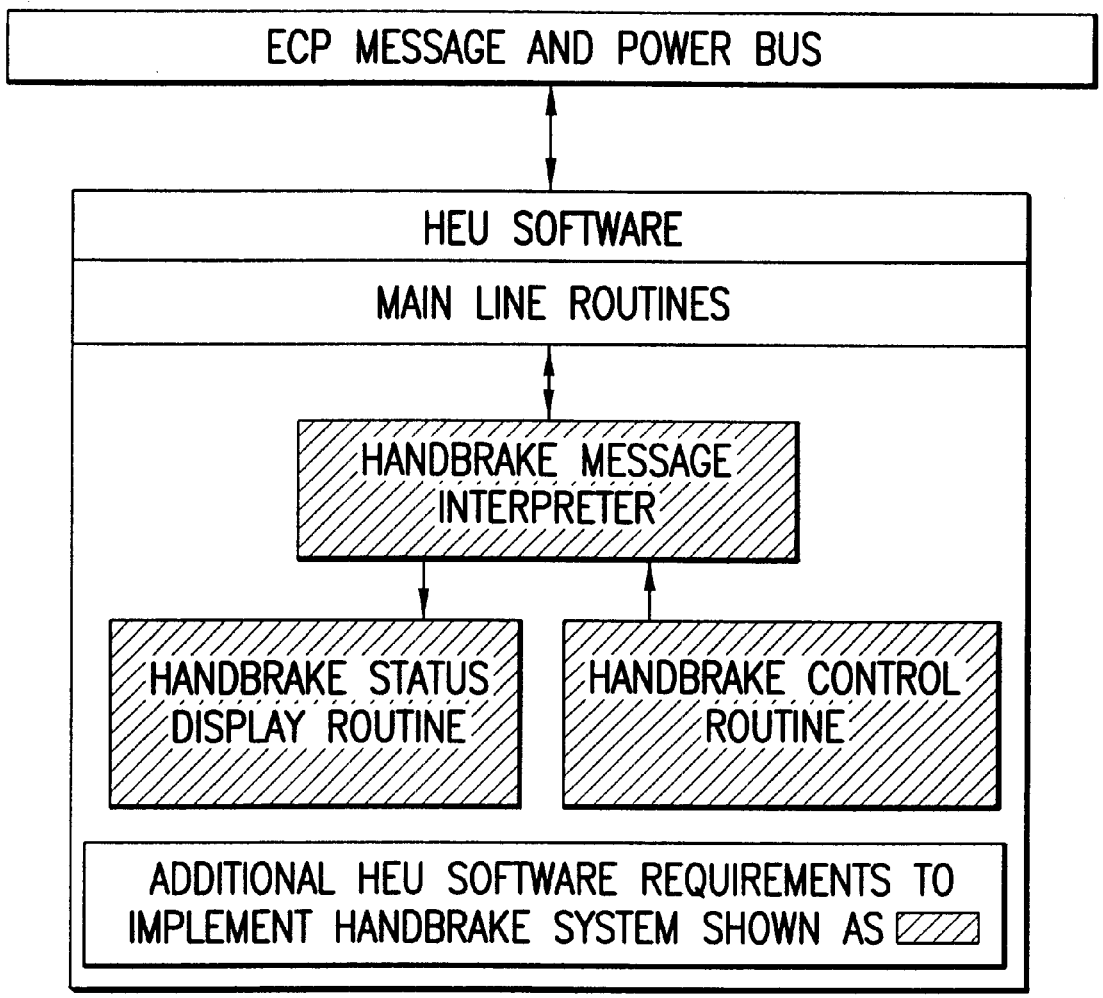
FIG. 5 is an operational software diagram for the system of FIG. 1.

FIG. 5 illustrates the on-board engine software for the preferred handbrake system 86. In the illustrated arrangement, existing status and control messages are passed between the HEU 20 and the CCD 22. The handbrake system 86 utilizes additional status and control information that is integrated into the message system either as additional unique messages or as elements within existing messages. Handbrake status and control information can be extracted from or integrated into the message system. Brake 46 status displays can be modified to incorporate the status and control of the handbrake system 86 in the operator control and status display routines. Because the handbrake system 86 incorporates both manual and automatic control, the software and message system monitors the status of the handbrake system 86 on a periodic basis to insure that any change in its status due to manual action is reported to the HEU 20 in a timely manner. The handbrake status routine in the CCD 22 can be polled at some periodic rate to properly report the brake 46 status in the event of manual activation. The hardware design of the brake 46 is such that the status is a true binary event. That is, the brake 46 is either "set" or "released." Status messages reflecting the current status of the handbrake 46 are reported back to the HEU 20. The routines in the HEU 20 can properly request and interpret the status of the handbrake 46 and display this information to the engineer.

The handbrake 46 control routines in the CCD 22 are generated in response to a message from the HEU 20, which is related to engagement or disengagement of the handbrake 46. The local control routine on the CCD 22 controls the proper sequencing of the four output wires 66 to properly perform the desired function. After a control message is operated the CCD 22 reports the status of the handbrake system 86 to the HEU 20 and again begins a periodic monitor of the handbrake 46 status (as above). If desired, the software in the HEU may be capable of displaying the status of the brake system 86 of each car 84 and provide a means for the engineer to initiate control signals which generate the appropriate messages to either engage or disengage the handbrake 86 system on any or all cars 84.

Figure 6:
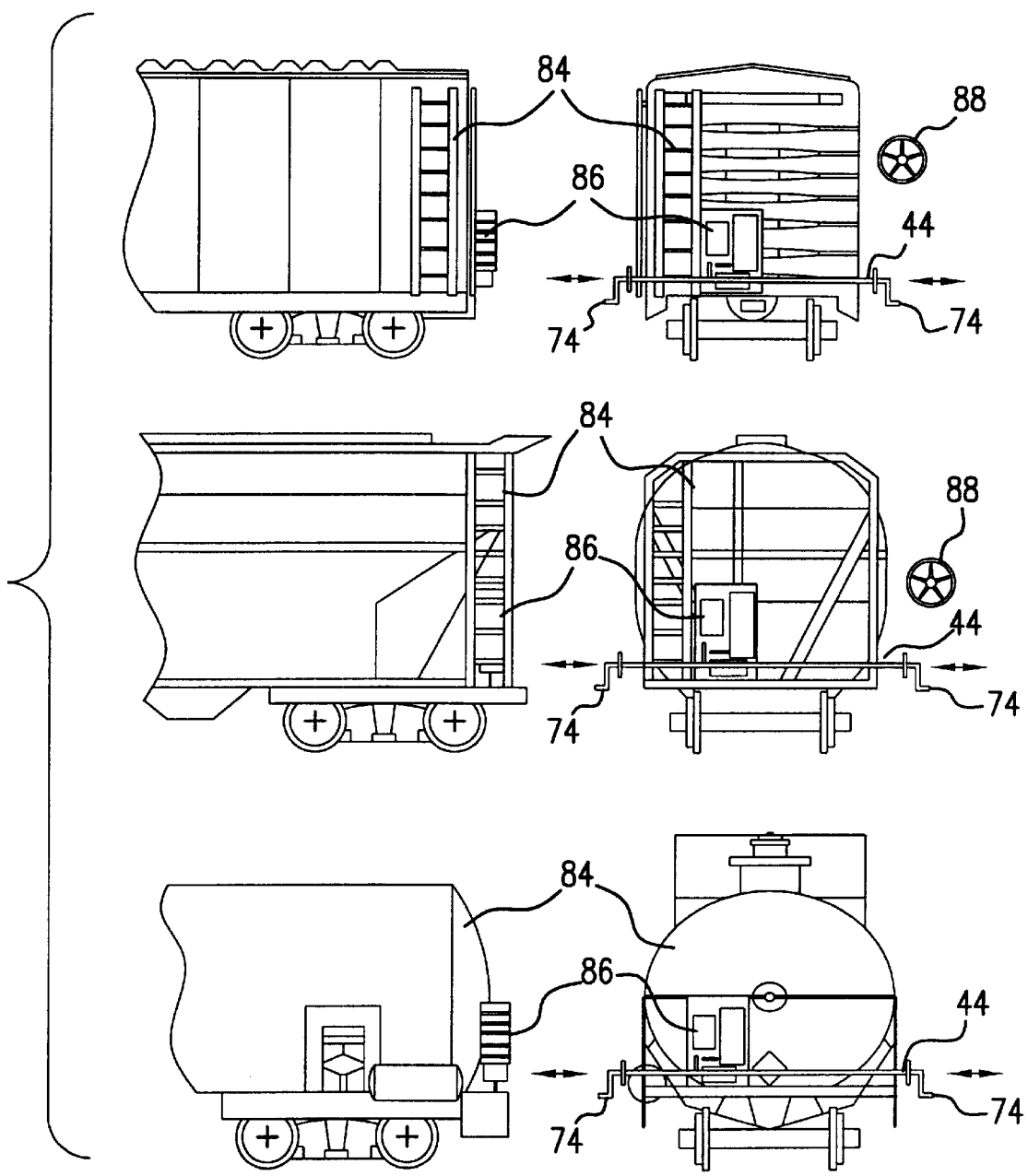
FIG. 6 provides side and end elevational views, showing the location of the handbrake system of FIG. 1 on three different types of freight cars.

Further, the hand crank mechanism 74 (FIGS. 1 and 3) can be selected on the basis of the desire to manually control the system from the side of the car 84 with the operator standing on the ground. A handwheel or lever system are alternative mechanisms that can be employed. Thus, referring to FIG. 6, the handbrake system 86 can be mounted on a single steel plate bolted to the freight car 84 in the approximate location of the existing handwheel 88 on most freight cars 84. The size of the system 86 is somewhat larger than that of the existing gear box and handwheel 88, but not much larger. FIG. 6 shows the mounted advanced handbrake actuator system 86 on three different types of freight cars 84. In each case, the system 86 is mounted so as to meet standard railway guidelines for mounting of equipment on cars 84.

Figure 7:
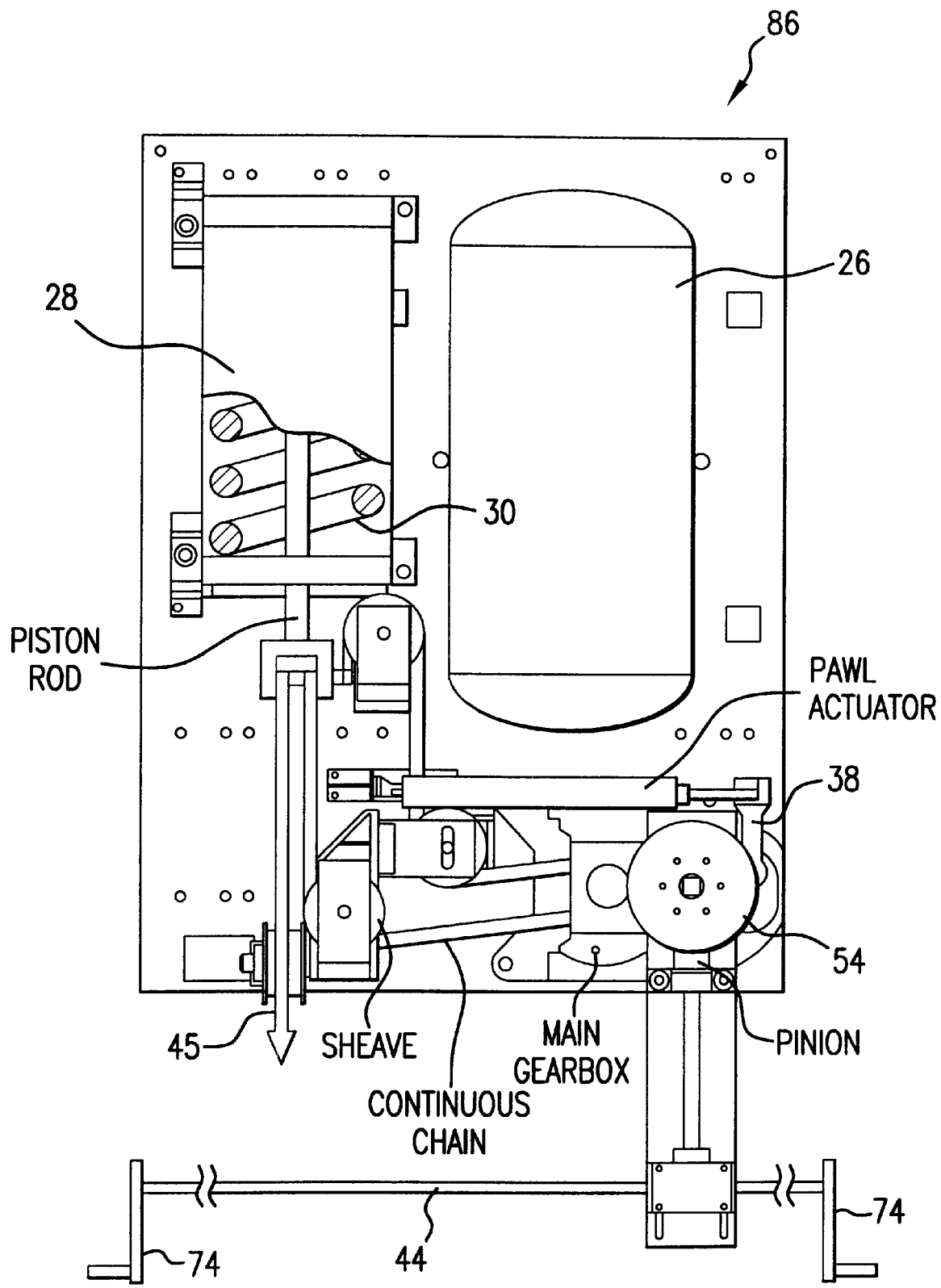
FIG. 7 is an elevational view of the handbrake system of FIG. 1.

FIG. 7 shows an example of how the present invention can be physically configured to fit onto a freight car 84. Illustrated is the relationship between the air reservoir 26, the main cylinder 28, the gear system (including the large gear 54, the hand crank 44 and lever 74, and the chain 45). Additional elements are shown, such as the piston rod for applying tension to the brake chain 40, the pawl actuator, which is attached to the pawl 38, the sheave and the main gearbox. As described above, this system 86 can be installed within the available space on modern freight cars 84. Also shown in FIG. 7 is a continuous chain arrangement that replaces the need for a gearbox spring made to collect the chain when the brake is released.

Current practice for determining whether a handbrake is engaged or not is to visually check the handbrake chain 45 or the handcrank to see if it is "tight" or "loose" as indicated by its sag or lack thereof. Using this method, a handbrake 46 may be mistakenly identified as being set when in reality the chain 45 tension may only be a fraction of that required to hold the car 84 still. The handbrake system 86 logic is arranged to follow the most recent command be it local or remote. A person ascertaining the handbrake 46 status of a particular car 84 is able to determine that the tension of the chain 45 is above a certain threshold to conclude the brake 46 is set. The present invention can use a simple two-part mechanical tension sensor 82, built into the actuator housing and in series with the chain 45. The device uses two springs and appropriate mechanical stops to determine when the tension of the chain 45 is above the 3350 lbs. required to set the brake 46 or below a value at which they are considered released. Relative motion generated by this device actuates a rotary indicator which has a placard with indicators such as statements like "Brake Set" and "Brake Released" at 180 degree intervals. A person can read the phrase which is right side up, which conveys the handbrake 46 status. The bottom half of the placard can be shrouded to enhance this clarity. If desired, a visual confirmation can be made not only that the chain 45 is tight, but that the tension in the handbrake chain 45 is adequate to correctly set the handbrake 46.

Prior to this invention there was no means for a locomotive engineer to ascertain the status of all handbrakes 46 for cars 84 in the train. The present invention can be employed, if desired, with two rugged, solid state proximity switches within the link chain tension sensor 82 housing described above, arranged to transmit an electrical signal via the ECP data link to the train engineer. In this manner, the train engineer can be cognizant of the status of every handbrake 46 in the entire train.

The above description and accompanying drawings are only illustrative of exemplary embodiments, which can achieve the features and advantages of the present invention. It is not intended that the invention be limited to the embodiments shown and described in detail herein. The invention can be modified to incorporate any number of variations, alterations, substitutions or equivalent arrangements not heretofore described, but which are commensurate with the spirit and scope of the invention. The invention is only limited by the scope of the following claims.

What is claimed as new and desired to be protected by Letters Patent of the United States is:

1. A system for actuating a brake on a train car, said system comprising:
   a first pneumatic device for releasing said brake;
   a second pneumatic device for setting said brake;
   a first spring controlled by said first pneumatic device, wherein said first spring engages and applies said brake; and
   a second spring controlled by said second pneumatic device, wherein said second spring maintains said brake in a released position.

2. The system of claim 1, wherein said first pneumatic device includes a spring for moving said brake to a set position and a piston for allowing said brake to move to a released position.

3. The system of claim 2, wherein said second pneumatic device includes a spring for securing gears in a set position and a piston for releasing said gears from said set portion.

4. The system of claim 1, further comprising one or more charging valves for charging said source at first and second flow rates.

5. The system of claim 4, further comprising one or more distribution valves for selectively controlling the flow of air from a pneumatic pressure source to said first and second pneumatic devices.

6. The system of claim 5, further comprising a control system for operating said one or more charging valves and said one or more distribution valves in a predetermined sequence.

7. The system of claim 6, further comprising a mechanical actuator for operating said one or more distribution valves by a person located near said train car.

8. The system of claim 7, further comprising a mechanical device for manually operating said brake from a position near said train car.

9. The system of claim 8, wherein said mechanical device is retractable.

10. The system of claim 1, further comprising a rotary tension sensor for determining the condition of said brake.

11. The system of claim 1, wherein said first and second pneumatic devices are connected to said train car.

12. The system of claim 1, comprising a source of stored pneumatic pressure for operating said first and second pneumatic devices, said source of stored pneumatic pressure being localized at said train car.

13. A pneumatic system for actuating a brake on a train car, said system comprising:
   a first spring-loaded piston for releasing said brake, a first pneumatic valve for supplying air pressure from a local pressure source to move said piston to a brake release position by compressing said spring, and a second pneumatic valve for bleeding air from said piston to move said piston to a second position opposite said brake release position by decompressing said spring;

a second spring-loaded piston for maintaining said brake in a disengaged position, and a third pneumatic valve for supplying air pressure from said local pressure source to said second piston; and a first signal valve for simultaneously operating said second and third pneumatic vales.

14. The system of claim 13, further comprising a second signal valve for operating said first pneumatic valve.

15. The system of claim 14, further comprising electrical devices for actuating said first and second signal valves.

16. The system of claim 15, further comprising a manually actuated valve for controlling said first and second signal valves.

17. The system of claim 16, further comprising one or more conduits for supplying air pressure from said source to said signal valves and said manually actuated valve.

* * * * *